United States Patent
Hansel et al.

(10) Patent No.: US 10,882,746 B2
(45) Date of Patent: Jan. 5, 2021

(54) METHOD FOR THE PURIFICATION OF YELLOW PHOSPHOR

(71) Applicant: LANXESS Deutschland GmbH, Cologne (DE)

(72) Inventors: Jan-Gerd Hansel, Bergisch Gladbach (DE); Rolf-Michael Jansen, Bergisch Gladbach (DE); Bernd Rosenow, Leverkusen (DE)

(73) Assignee: LANXESS Deutschland GmbH, Cologne (DE)

(*) Notice: Subject to any disclaimer, the term of this patent is extended or adjusted under 35 U.S.C. 154(b) by 82 days.

(21) Appl. No.: 16/323,273

(22) PCT Filed: Jul. 7, 2017

(86) PCT No.: PCT/EP2017/067111
§ 371 (c)(1),
(2) Date: Feb. 5, 2019

(87) PCT Pub. No.: WO2018/028905
PCT Pub. Date: Feb. 15, 2018

(65) Prior Publication Data
US 2019/0202698 A1 Jul. 4, 2019

(30) Foreign Application Priority Data

Aug. 8, 2016 (EP) .................................. 16183207

(51) Int. Cl.
| | | |
|---|---|---|
| C01B 25/047 | (2006.01) |
| B01J 20/20 | (2006.01) |
| B01J 20/28 | (2006.01) |
| B01J 20/34 | (2006.01) |

(52) U.S. Cl.
CPC .............. C01B 25/047 (2013.01); B01J 20/20 (2013.01); B01J 20/28004 (2013.01); B01J 20/28019 (2013.01); B01J 20/28064 (2013.01); B01J 20/28066 (2013.01); B01J 20/3416 (2013.01); B01J 20/3475 (2013.01)

(58) Field of Classification Search
CPC ... C01B 25/047; B01J 20/20; B01J 20/28004; B01J 20/28019; B01J 20/28064; B01J 20/28066; B01J 20/3416; B01J 20/3475
See application file for complete search history.

(56) References Cited

U.S. PATENT DOCUMENTS

| | | | | |
|---|---|---|---|---|
| 3,836,675 A | * | 9/1974 | Hartlapp et al. | ...... C01B 25/047 423/322 |
| 4,375,457 A | * | 3/1983 | Sherif | ................... C01B 25/047 423/299 |
| 4,664,896 A | * | 5/1987 | Hall | ...................... C01B 25/027 423/304 |
| 5,283,042 A | | 2/1994 | Legrand et al. | |

FOREIGN PATENT DOCUMENTS

| | | | | |
|---|---|---|---|---|
| DE | 1143794 B | * | 2/1963 | ........... C01B 25/047 |
| DE | 1143794 B | | 2/1963 | |
| DE | 4203011 A1 | | 8/1993 | |

OTHER PUBLICATIONS

Henning, Klaus-Dirk, et al. Ullmann's Encyclopedia of Industrial Chemistry, Carbon, 5. Activated Carbon, 2010, Wiley-VCH Verlag, pp. 1-27.
European Search Report from corresponding European Application No. 16183207, dated Feb. 7, 2017, two pages.

* cited by examiner

*Primary Examiner* — Anthony J Zimmer
(74) *Attorney, Agent, or Firm* — Nicanor A. Kohncke; Christopher L. McDavid

(57) ABSTRACT

The present invention relates to a process for continuous purification of yellow phosphorus by adsorption onto activated carbon.

19 Claims, No Drawings

METHOD FOR THE PURIFICATION OF YELLOW PHOSPHOR

The present invention relates to a process for purifying impure yellow phosphorus by adsorption onto activated carbon.

Elemental phosphorus is produced industrially by reduction of phosphate ore with coke in an electrothermal furnace. The thus obtained phosphorus modification is the so-called white phosphorus or tetraphosphorus having the formula $P_4$, a solid which is nearly colorless in pure form and has a melting point of 44° C. However, the industrial product typically has a yellow or brown color and is therefore marketed as "yellow phosphorus". In the context of the present invention the term "phosphorus" is hereinbelow used exclusively to describe tetraphosphorus having the formula $P_4$.

The yellow color of the yellow phosphorus is due to impurities. According to DE 11 43 794 A1 the impurities may be inorganic constituents or organic compounds. Since they are disruptive in the processing of the phosphorus into descendent products, numerous processes for purifying yellow phosphorus have previously been disclosed in the literature.

To separate organic compound impurities in the yellow phosphorus, DE 11 43 794 A1, DE 21 35 546 A1, U.S. Pat. No. 5,283,042 and DE 42 03 011 A1 for example disclose processes for purification by adsorption onto activated carbon. However, these purification processes have disadvantages.

Thus according to the process from DE 11 43 794 A1 the yellow phosphorus in the form of a melt is initially washed with polyphosphoric acid and then further purified by treatment with activated carbon. However, the phosphorus must be freed from adherent water prior to the activated carbon treatment. This entails additional complexity since yellow phosphorus is in industry always handled under a covering layer of water ("covering water") to protect it from contact with air. Furthermore, DE 11 43 794 A1 requires the use of a fuller's earth in addition to the activated carbon. The polyphosphoric acid wash, the freeing from water and the use of fuller's earth make the process complex and result in the generation of wastes that are difficult to dispose of.

In the processes from DE 21 35 546 A1, U.S. Pat. No. 5,283,042 and DE 42 03 011 A1 activated carbon in the form of an aqueous suspension or as a dry powder is contacted with the molten yellow phosphorus and after a residence time separated therefrom again by filtration or centrifugation. The disadvantages of these processes result from the necessary solids handling, i.e. the addition of the activated carbon, the separation of the spent activated carbon by filtration and the discharging of the spent activated carbon from the filtration apparatus. Particularly when such processes are to be performed continuously, this solids handling entails considerable process engineering complexity. The proposal of facilitating the addition of the activated carbon by employing said carbon as a pumpable aqueous suspension entails the disadvantage of a reduced space-time yield.

The prior art purification processes typically employ 0.5 to 5 weight percent of activated carbon based on the purified amount of phosphorus. It is desirable to achieve the required purification effect with the smallest possible amount of activated carbon. This reduces not only the cost of obtaining the activated carbon but also complexity and the losses of phosphorus associated with disposing of the spent activated carbon.

A further disadvantage of the recited processes is due to the fact that the spent activated carbon is separable from the phosphorus only incompletely. The filtercake thus contains significant amounts of phosphorus. This makes disposal of the filtercake complex due to the autoignitability of the phosphorus in air. This also represents an economic loss. Proposals for solving this problem are known. Thus, according to DE 11 43 794 A1 the adherent phosphorus in the spent activated carbon shall initially be made harmless by treatment with a 5% to 20% copper sulfate solution. The yellow phosphorus is thus converted into nonhazardous copper phosphide. Disadvantages of this process are the economic loss of this phosphorus amount and the complexity of disposal of the copper phosphide. According to U.S. Pat. No. 4,664,896 the solid filtercake shall be diluted with liquid phosphorus and thus converted into a flowable suspension which is accordingly easier to send for disposal. However, this approach makes economic sense only when the phosphorus present in the suspension can be recovered. Also proposed is introducing the flowable suspension into an electrothermal phosphorus furnace in order thus to be able to recover the phosphorus present in the filtercake. However, this solution is practicable only when transport of the filtercake to the furnace can be achieved with acceptable complexity.

The present invention has for its object to provide a process for purifying impure yellow phosphorus by adsorption onto activated carbon which overcomes the recited disadvantages of the prior art.

In the context of the present invention the term "impure phosphorus" is hereinbelow to be understood as meaning tetraphosphorus having a content of organic impurities of 10,000 to 10 ppm and the term "purified phosphorus" is to be understood as meaning a tetraphosphorus obtained by purification of impure phosphorus by the process according to the invention and having a content of organic impurities lower than the employed impure phosphorus.

The invention provides a process for purifying impure phosphorus by adsorption onto activated carbon, characterized in that
a) without prior treatment with polyphosphoric acid liquid impure phosphorus is continuously contacted with at least one activated carbon fixed bed containing at least one activated carbon, preferably as particles having a particle size in the range from 0.5 to 5 mm or as molded bodies, and
b) liquid purified phosphorus is continuously withdrawn from the activated carbon fixed bed(s).

It is preferable when step a) of the process according to the invention employs impure phosphorus such as is generated in industrial phosphorus derivation. It is preferable when the phosphorus is employed in step a) of the process according to the invention in the form generated in industrial derivation without any upstream purification steps.

The process according to the invention is preferably used for purifying impure phosphorus of organic impurities. The term "organic impurities" is to be understood as meaning compounds such as are in admixture with the obtained phosphorus in the industrial derivation of phosphorus, for example by heating of phosphorus minerals such as phosphorite or apatite with quartz chips in a submerged arc furnace. The organic impurities may be hydrocarbons or phenols for example.

It is preferable when step a) of the process according to the invention employs impure phosphorus having a content of organic impurities in the range from 5000 to 10 ppm, particularly preferably in the range from 3000 to 50 ppm and in particular in the range from 1500 to 100 ppm.

It is preferable when the content of organic impurities in the purified phosphorus withdrawn in step b) of the process according to the invention is at least 50%, particularly preferably 55 to 95%, below the content of organic impurities of the impure phosphorus employed in step a) of the process according to the invention.

The content of organic impurities may be determined in a manner known to those skilled in the art, for example by gravimetric or spectroscopic methods.

It is essential to the present invention that in the purification of the impure phosphorus during the contacting with and the separation from the liquid phosphorus phase the activated carbon remains stationary and the liquid phosphorus phase for purification is continuously conveyed toward the activated carbon and the purified liquid phosphorus phase is continuously conveyed away therefrom.

In the context of the present invention the term "fixed bed" is to be understood as meaning a stationary dumped or packed bed arranged inside a container for example.

The process according to the invention is preferably performed in at least one closed container. The term "container" is to be understood as meaning a delimited space suitable for performing the process according to the invention. The container to be employed according to the invention is in particular used for receiving and securing the activated carbon fixed bed.

The container to be used for performing the process according to the invention may have different three-dimensional shapes known to those skilled in the art, for example cylindrical, conical, spherical or a suitable combination of these shapes. The container preferably has at least one inflow opening and at least one outflow opening.

The container may be made of different materials, for example of metallic materials, in particular stainless steel or nonferrous metal alloys, plastic or glass. The container is preferably made of stainless steel.

It is particularly preferable when the process according to the invention is performed in a container having a cylindrical shape and a height to width ratio of 10:1 to 1:10, preferably 5:1 to 1:5, in particular a column.

The container preferably has at least one inflow point for the liquid impure phosphorus, at least one adsorption zone and at least one outflow point for the purified phosphorus which is spatially removed from the inflow point.

To perform the process according to the invention the activated carbon fixed bed is preferably arranged in the adsorption zone of the container.

It is preferable when the container used for performing the process according to the invention has at least one apparatus for installation and deinstallation and at least one apparatus for securing the activated carbon fixed bed in the adsorption zone of the container.

The apparatus which allows installation and deinstallation of the activated carbon fixed bed in the adsorption zone of the container is required for loading of the container with a fresh activated carbon fixed bed and removal of a spent activated carbon fixed bed. Contemplated for this purpose for example is a manhole.

Contemplated apparatuses used for securing the activated carbon fixed bed in the adsorption zone of the container include for example sieve trays, perforated plates or wire meshes. Structured activated carbon packings, for example activated carbon cartridges are secured by appropriate internals in the container. It is preferable when the activated carbon fixed bed is secured in the adsorption zone of the container by at least one sieve tray.

It is preferable when the container further comprises apparatuses for temperature control, for example a means for heating with steam, heat transfer liquids or electrical heating elements.

It is preferable when the process according to the invention is performed such that the liquid impure phosphorus is continuously introduced into the container via the inflow point and in the adsorption zone is continuously contacted with the activated carbon fixed bed secured therein and that the liquid purified phosphorus is continuously withdrawn at the outflow point of the container.

In the context of the invention the term "activated carbon" is to be understood as meaning carbon-based solid adsorbents. This comprises not only the known activated carbons in the strict sense but also activated coke and carbon-based molecular sieves made of bituminous coal, coconut coke and charcoal. The activated carbons suitable for the process according to the invention are known from the prior art. Crucial for the choice of the activated carbon is the suitability thereof for forming a secured fixed bed.

The activated carbon employed according to the invention is preferably a particulate, in particular a grained, crushed, granulated, pelletized, molded or spherical, activated carbon having a particle size of 0.5 to 5 mm. The specific internal surface area is preferably from 500 to 1500 m$^2$/g.

Examples of suitable activated carbons include the molded or crushed types having the trade names Hydraffin® and Epibon® (Donau Carbon) Filtrasorb® and AP 4-60 (Calgon Carbon), Acticarbon® (Arkema), ColorSorb® (Jacobi) and C40/1 and CGK 8*16/90 (Carbotech AC GmbH).

Likewise suitable and preferred are molded bodies formed from activated carbon, for example porous internals and structured packings, for example having a honeycomb structure, or fibrous activated carbon, for example in the form of fiber mats.

The activated carbon fixed bed may contain not only the activated carbon but also one or more adsorbents distinct from activated carbon, for example zeolites, argillaceous earths, diatomaceous earths, silica gels, fuller's earths, perlites, magnesium silicates, glass particles or organic polymers. It is preferable when the activated carbon fixed bed contains fuller's earths and/or glass particles as further adsorbents. The adsorbents distinct from activated carbon may be employed in an amount of 0.1 to 20 weight percent, preferably of 0.5 to 10 weight percent, based on the activated carbon.

The amount of activated carbon present in the activated carbon fixed bed is 0.1 to 500 weight percent based on the amount of purified phosphorus withdrawn from the activated carbon fixed bed, preferably at the outflow point of the container, per hour according to step b). It is preferable when the activated carbon amount is 1 to 300 weight percent, particularly preferably 1 to 50 weight percent, in each case based on the amount of purified phosphorus withdrawn from the activated carbon fixed bed per hour.

The size of the fixed bed required in practice to realize purification of phosphorus on an industrial scale is known to those skilled in the art.

The process according to the invention is generally performed at a temperature in the range from 45° C. to 120° C., i.e. in a temperature range in which the phosphorus is in the form of a melt. The process is preferably performed at a temperature in the range from 45° C. to 95° C. This is the temperature in the activated carbon fixed bed, preferably the temperature inside the container.

In the process according to the invention the phosphorus is preferably always blanketed with a layer of water ("covering water"). This applies in particular to the receiver vessel for the impure phosphorus and the collection vessel for the purified phosphorus. It is harmless to the performance of the process according to the invention when the container comprising the activated carbon fixed bed also contains covering water. However it is preferable when only the liquid phosphorus is passed into the container. Drying of the phosphorus before purification is not necessary.

The process according to the invention is generally performed at a pressure at which the covering water does not boil in the temperature range specified above. It is preferably performed at 0.1 to 3.0 bar absolute.

The liquid impure phosphorus is generally passed through the adsorption zone of the container with a volume flow that ensures an average residence time of the phosphorus in the activated carbon fixed bed of 1 to 600 minutes, preferably of 1 to 300 minutes and particularly preferably of 2 to 100 minutes. The average residence time is defined as the quotient of the volume of the fixed bed to the outflowing volume flow. In an alternative embodiment of the process according to the invention in step a) the liquid impure phosphorus is divided into two or more substreams and each substream is contacted with a separate activated carbon fixed bed, wherein each activated carbon fixed bed is preferably arranged in a separate container.

In a further alternative embodiment of the process according to the invention the liquid impure phosphorus is divided into two or more substreams and for each substream the steps a) and b) are performed with a separate activated carbon fixed bed which is preferably arranged in a separate container, wherein the number of substreams and the number of activated carbon fixed beds is preferably chosen such that always at least one activated carbon fixed bed is utilized for performing steps a) and b) and in at least one activated carbon fixed bed the activated carbon is regenerated or replaced.

The impurities present in the impure phosphorus are adsorbed by the activated carbon. In the continuous phosphorus purification according to the invention the purification activity of the activated carbon decreases as a result of increasing loading with impurities. When the purification activity has decreased such that the desired purification is no longer achieved the phosphorus purification is interrupted and the spent activated carbon laden with impurities is replaced by fresh activated carbon or regenerated by a suitable process. The regeneration of spent activated carbon is known to those skilled in the art, for example from KLAUS-DIRK HENNING, HARTMUT VON KIENLE: "Carbon, 5. Activated Carbon" in Ullmann's Encyclopedia of Industrial Chemistry, Wiley, Weinheim 2010, Chapter 5.

When the purification activity of the activated carbon in the activated carbon fixed bed has been spent an alternative embodiment of the process according to the invention comprises following steps a) and b) with the steps of
c) contacting the activated carbon fixed bed with hot water or water vapor,
d) withdrawing water and phosphorus from the activated carbon fixed bed according to step c),
e) regenerating or replacing with fresh activated carbon the spent activated carbon in the activated carbon fixed bed and
f) recycling the phosphorus withdrawn in step d) back into step a).

In this alternative embodiment of the process according to the invention a large part of the phosphorus present in the spent activated carbon may be recovered. This reduces the economic loss of this phosphorus content and markedly simplifies the safe handling of the spent activated carbon.

In a preferred alternative embodiment of the process according to the invention the liquid impure phosphorus is divided into two or more substreams and for each substream the steps a) and b) are performed with a separate activated carbon fixed bed which is preferably arranged in a separate container in each case, wherein the number of substreams and the number of activated carbon fixed beds is chosen such that always at least one activated carbon fixed bed is utilized for performing steps a) and b) and in at least one activated carbon fixed bed steps c) to f) are performed.

In these further alternative embodiments it is preferable when in step c) of the process according to the invention liquid water at a temperature of 45° C. to 160° C. or water vapor at a temperature of 100° C. to 240° C. is employed.

It is preferable when in these further alternative embodiments step c) of the process according to the invention is performed such that the liquid or vaporous water is continuously introduced into the container(s) via the inflow point and in the adsorption zone is continuously contacted with the spent activated carbon fixed bed secured therein and at the outflow point(s) of the container(s) the liquid phosphorus is continuously withdrawn, optionally with cooling, preferably to 45° C. to 90° C.

The process according to the invention makes it possible to reduce the content of organic impurities in the range from 10,000 to 10 ppm by at least 50% in impure phosphorus in a continuous mode of operation using an activated carbon fixed bed. Addition and filtration of the activated carbon is not necessary here. The securing of the activated carbon in a fixed bed moreover facilitates simple recovery of the phosphorus contained therein from the spent activated carbon.

The examples which follow more particularly elucidate the invention without any intention to limit the invention.

EXAMPLES

Example 1

Continuous Purification of Impure Yellow Phosphorus with Activated Carbon Fixed Bed (Inventive)

A circular, correctly sized stainless steel mesh was secured in a glass tube having an internal diameter of 22.3 mm as a sieve tray. The tube was then filled with an aqueous suspension of 11.3 g of "C40/1" granulated activated carbon from Carbotech AC GmbH, Essen. The volume of the activated carbon dumped bed was 29.8 ml. Both ends of the tube were then provided with hose connections by means of screw caps. The tube was placed in a water bath temperature-controlled to 55° C.

A sample of impure phosphorus blanketed with covering water was melted. The melt was cloudy, yellowish-brown and contained 1100 ppm of organic impurities. A pump was used to pump the melt into the glass tube charged with the activated carbon at a constant conveying rate. The purified phosphorus outflowing at the other end of the glass tube was collected in ten fractions in glass vessels blanketed with covering water and temperature-controlled to 55° C. The phosphorus melt was clear and light yellow. The masses of the fractions and their content of organic impurities were determined and the results are reported in table 1. After a run time of 25.9 hours 1822.7 g of purified phosphorus had been collected and the experiment was terminated.

Evaluation of the final weights revealed that the volume flow had remained constant at 41 ml/h over the entire experimental duration. This corresponds to an average residence time of the yellow phosphorus in the fixed bed of 44 minutes. The amount of activated carbon present in the fixed bed corresponded to 15% by weight based on the mass of phosphorus withdrawn from the adsorption zone per hour.

The content of organic impurities in the yellow phosphorus was markedly reduced, the purification activity declining over the course of the experiment. The total amount of 1822.7 g of purified yellow phosphorus contained 180 ppm of organic impurities, i.e. only 16% of the originally present amount. The content of organic impurities in the purified phosphorus was thus 84% below the content of organic impurities in the employed impure phosphorus. The amount of activated carbon employed for this purification experiment corresponded to 0.6 weight percent of the total amount of yellow phosphorus.

TABLE 1

Final weights and purity of phosphorus after purification over an activated carbon fixed bed from example 1

| Fraction | Time of sampling [h] | Mass of sample [g] | Content of organic impurities [ppm] |
|---|---|---|---|
| 1 | 2.8 | 100.7 | 37 |
| 2 | 6.6 | 274.5 | 40 |
| 3 | 11.6 | 393.5 | 106 |
| 4 | 13.8 | 146.4 | 146 |
| 5 | 15.5 | 146.4 | 193 |
| 6 | 18.2 | 146.4 | 206 |
| 7 | 19.5 | 146.4 | 261 |
| 8 | 21.6 | 151.9 | 280 |
| 9 | 23.7 | 151.9 | 312 |
| 10 | 25.9 | 164.7 | 392 |

Example 2

Purification of Impure Yellow Phosphorus with Activated Carbon According to a Batch Process (Noninventive)

54.2 g of impurified yellow phosphorus having a content of organic impurities of 1120 ppm were melted under a covering layer of water. The melt was cloudy and yellowish-brown. Said melt was admixed with an aqueous suspension of 0.65 g of "C40/1" granulated activated carbon from Carbotech AC GmbH, Essen and stirred at 55° C. for a residence time of 60 minutes with a magnetic stirrer. The obtained mixture was filtered through a glass frit of porosity 2 under covering water. The filtrate collected was a virtually clear melt of yellow phosphorus having a content of organic impurities of 970 ppm.

The simple batch purification with 1.2% activated carbon based on the amount of yellow phosphorus thus reduced the content of organic impurities to 87% of the originally present amount. The content of organic impurities in the purified phosphorus was thus 13% below the content of organic impurities in the employed impure phosphorus.

Example 3

Purification of Yellow Phosphorus with Activated Carbon According to a Batch Process (Noninventive)

97.2 g of impurified yellow phosphorus having a content of organic impurities of 830 ppm were melted under a covering layer of water. The melt was cloudy and yellowish-brown. Said melt was admixed with an aqueous suspension of 1.94 g of "C40/1" granulated activated carbon from Carbotech AC GmbH, Essen and stirred at 60° C. for a residence time of 60 minutes with a magnetic stirrer. The obtained mixture was filtered through a glass frit of porosity 2 under covering water. The filtrate collected was a virtually clear melt of yellow phosphorus having a content of organic impurities of 300 ppm.

The simple batch purification with 2.0% activated carbon based on the amount of yellow phosphorus thus reduced the content of organic impurities to 36% of the originally present amount. The content of organic impurities in the purified phosphorus was thus 64% below the content of organic impurities in the employed impure phosphorus.

Conclusion: The comparative examples 2 and 3 show that simple batch purification according to the prior art with 1.2% and 2.0% activated carbon based on the amount of yellow phosphorus achieves a reduction in the organic impurities to 87% and 36% of the originally present amount respectively. By contrast the inventive, continuous process (cf. example 1) achieves a reduction in the organic impurities to 16% of the originally present amount with only 0.6% activated carbon based on the amount of yellow phosphorus. The efficacy of the purification is thus markedly better in the process according to the invention.

Example 4

Continuous Purification of Impure Yellow Phosphorus with Activated Carbon Fixed Bed (Inventive)

A glass tube as described in example 1 was filled with an aqueous suspension of 11.3 g of "C40/1" granulated activated carbon from Carbotech AC GmbH, Essen and placed in a water bath temperature-controlled to 55° C.

A first sample of crude yellow phosphorus blanketed with covering water was melted. The melt was cloudy, yellowish-brown and contained 990 ppm of organic impurities. A pump was used to pump the melt into the glass tube charged with the activated carbon at a constant conveying rate. The purified yellow phosphorus outflowing at the other end of the glass tube was collected in fractions 1 to 10 in glass vessels blanketed with water and temperature-controlled to 55° C., see table 2. After 21.0 hours altogether 1639.7 g of purified yellow phosphorus had been collected. The experiment was then continued under the same conditions with a second sample of crude yellow phosphorus. This second sample contained 1020 ppm of organic impurities. The outflow from the glass tube was collected in fractions 11 to 34, see table 3. After altogether 69.0 hours 5352.8 g of yellow phosphorus had been purified via the same activated carbon fixed bed and the experiment was terminated.

All of the 34 fractions in total were weighed and nine selected fractions were analyzed; the results are reported in tables 2 and 3. Evaluation of the final weights revealed that the volume flow had remained constant at 43 ml/h over the entire experimental duration. This corresponds to an average residence time of the yellow phosphorus in the fixed bed of 41 minutes. The amount of activated carbon present in the fixed bed corresponded to 14% by weight based on the mass of phosphorus withdrawn from the adsorption zone per hour.

The content of organic impurities in the yellow phosphorus was markedly reduced, the purification activity declining over the course of the experiment. The total amount of 5352.8 g of purified yellow phosphorus contained 450 ppm of organic impurities, i.e. only 44% of the originally present amount. The amount of activated carbon employed for this purification experiment corresponded to 0.2% of the total amount of yellow phosphorus.

TABLE 2

Final weights and purity of phosphorus (fractions 1 to 10) after purification over an activated carbon fixed bed from example 4

| Fraction | Time of sampling [h] | Mass of sample [g] | Content of organic impurities [ppm] |
|---|---|---|---|
| 1  | 2.5  | 135.42 | 41  |
| 2  | 4.6  | 139.08 |     |
| 3  | 6.6  | 164.70 |     |
| 4  | 8.6  | 161.04 |     |
| 5  | 11.0 | 164.70 | 132 |
| 6  | 13.0 | 157.38 |     |
| 7  | 15.5 | 183.00 |     |
| 8  | 17.7 | 173.85 | 229 |
| 9  | 18.7 | 192.15 |     |
| 10 | 21.0 | 168.36 |     |

TABLE 3

Final weights and purity of phosphorus (fractions 11 to 34) after purification over activated carbon fixed bed from example 4

| Fraction | Time of sampling [h] | Mass of sample [g] | Content of organic impurities [ppm] |
|---|---|---|---|
| 11 | 23.0 | 164.70 | 345 |
| 12 | 25.0 | 173.85 |     |
| 13 | 27.0 | 155.55 |     |
| 14 | 29.0 | 157.38 |     |
| 15 | 31.0 | 153.72 | 503 |
| 16 | 33.0 | 157.38 |     |
| 17 | 35.0 | 151.89 |     |
| 18 | 37.0 | 146.40 |     |
| 19 | 39.0 | 153.72 |     |
| 20 | 41.0 | 153.72 | 543 |
| 21 | 43.0 | 161.04 |     |
| 22 | 45.0 | 144.57 |     |
| 23 | 47.0 | 153.72 |     |
| 24 | 49.0 | 150.06 |     |
| 25 | 51.0 | 150.06 | 636 |
| 26 | 53.0 | 142.74 |     |
| 27 | 55.0 | 157.38 |     |
| 28 | 57.0 | 153.72 |     |
| 29 | 59.0 | 155.55 |     |
| 30 | 61.0 | 157.38 | 654 |
| 31 | 63.0 | 157.38 |     |
| 32 | 65.0 | 153.72 |     |
| 33 | 67.0 | 172.02 |     |
| 34 | 69.0 | 135.42 | 697 |

Example 5

Continuous Purification of Impure Yellow Phosphorus with Activated Carbon Fixed Bed (Inventive)

A glass tube as described in example 1 was filled with an aqueous suspension of 11.3 g of "C40/1" granulated activated carbon from Carbotech AC GmbH, Essen and placed in a water bath temperature-controlled to 55° C.

A sample of crude yellow phosphorus blanketed with covering water was melted. The melt was cloudy, yellowish-brown and contained 1230 ppm of organic impurities. Using a pump the melt was pumped into the glass tube charged with the activated carbon at a constant conveying rate which was, however, higher than examples 1 and 4. The purified yellow phosphorus outflowing at the other end of the glass tube was collected in six fractions in glass vessels blanketed with water and temperature-controlled to 55° C. The phosphorus melt was clear and light yellow. The fractions were weighed and two selected fractions were analyzed; the results are reported in table 4. After 120 minutes altogether 1024.8 g of purified yellow phosphorus had been collected.

Evaluation of the final weights revealed that the volume flow had remained constant at 311 ml/h over the entire experimental duration. This corresponds to an average residence time of the yellow phosphorus in the fixed bed of 5.8 minutes. The amount of activated carbon present in the fixed bed corresponded to 2% by weight based on the mass of phosphorus withdrawn from the adsorption zone per hour. The content of organic impurities in the yellow phosphorus was markedly reduced, the purification activity declining over the course of the experiment.

TABLE 4

Final weights and purity of phosphorus after purification over an activated carbon fixed bed from example 5

| Fraction | Time of sampling [min] | Mass of sample [g] | Content of organic impurities [ppm] |
|---|---|---|---|
| 1 | 28  | 157.38 | 170 |
| 2 | 44  | 153.72 |     |
| 3 | 63  | 192.15 |     |
| 4 | 80  | 162.87 |     |
| 5 | 101 | 183.00 | 463 |
| 6 | 120 | 175.68 |     |

Example 6

Continuous Purification of Impure Yellow Phosphorus with Activated Carbon Fixed Bed (Inventive)

A glass tube as described in example 1 was filled with an aqueous suspension of 11.3 g of "CGK 8*16/90" granulated activated carbon from Carbotech AC GmbH, Essen and placed in a water bath temperature-controlled to 55° C.

A sample of crude yellow phosphorus blanketed with covering water was melted. The melt was cloudy, yellowish-brown and contained 1150 ppm of organic impurities. A pump was used to pump the melt into the glass tube charged with the activated carbon at a constant conveying rate. The purified yellow phosphorus outflowing at the other end of the glass tube was collected in fractions in glass vessels blanketed with water and temperature-controlled to 55° C. The phosphorus melt was clear and light yellow. The fractions were weighed and eight selected fractions were analyzed; the results are reported in table 5. After 47.8 hours altogether 3645.4 g of purified yellow phosphorus had been collected.

Evaluation of the final weights revealed that the volume flow had remained constant at 43 ml/h over the entire experimental duration. This corresponds to an average residence time of the yellow phosphorus in the fixed bed of 42 minutes. The amount of activated carbon present in the fixed bed corresponded to 14% by weight based on the mass of phosphorus withdrawn from the adsorption zone per hour. The content of organic impurities in the yellow phosphorus was markedly reduced, the purification activity declining over the course of the experiment.

TABLE 5

Final weights and purity of phosphorus after purification over an activated carbon fixed bed from example 6

| Fraction | Time of sampling [min] | Mass of sample [g] | Content of organic impurities [ppm] |
|---|---|---|---|
| 1 | 2.6 | 139.08 | 324 |
| 2 | 5.1 | 204.96 | |
| 3 | 7.1 | 146.40 | |
| 4 | 9.6 | 190.32 | 402 |
| 5 | 12.0 | 183.00 | |
| 6 | 14.5 | 201.30 | |
| 7 | 17.7 | 190.32 | 388 |
| 8 | 19.8 | 183.00 | |
| 9 | 21.5 | 146.40 | |
| 10 | 23.7 | 179.34 | 505 |
| 11 | 25.8 | 179.34 | |
| 12 | 27.8 | 161.04 | |
| 13 | 30.1 | 179.34 | 517 |
| 14 | 32.2 | 172.02 | |
| 15 | 34.7 | 201.30 | |
| 16 | 37.0 | 162.87 | 535 |
| 17 | 39.2 | 175.68 | |
| 18 | 41.6 | 186.66 | |
| 19 | 43.6 | 150.06 | 593 |
| 20 | 45.8 | 162.87 | |
| 21 | 47.8 | 150.06 | 608 |

Example 7

Recovery of Yellow Phosphorus from an Activated Carbon Fixed Bed (Inventive)

After completion of the purification experiment described in example 1 a sample of the spent activated carbon was withdrawn from the glass tube under water. Even in a water-moist state this activated carbon underwent autoignition at room temperature as soon as it contacted air.

The glass tube filled with the remaining spent activated carbon was again provided with the hose connections and using an electrical heating tape heated to about 110° C. outside the water bath. Boiling water was then pumped into the glass tube through one of the hose connections. The liquid mixture outflowing from the glass tube at the other hose connection was passed into a receiver filled with covering water and therein cooled to about 55° C. A liquid phosphorus phase separated out in the receiver.

Once no more phosphorus separated out in the receiver during the washing with boiling water the recovery experiment was terminated. After cooling the column was once more opened underwater to take a sample of the spent activated carbon. This activated carbon was no longer autoignitable in air, even once dried.

This example shows that the spent activated carbon is dangerous and difficult to handle on account of its phosphorus content. The recovery process according to the invention reduces the economic loss of this phosphorus content and markedly simplifies the handling of the spent activated carbon.

What is claimed is:

1. A process for purifying impure phosphorus comprising:
   a) continuously introducing and contacting liquid impure phosphorus, without prior treatment of the impure phosphorus with polyphosphoric acid, with at least one activated carbon fixed bed containing at least one activated carbon, and
   b) continuously withdrawing liquid purified phosphorus from the activated carbon fixed bed.

2. The process as claimed in claim 1, wherein the activated carbon fixed bed comprises at least one activated carbon selected from the group consisting of grained, crushed, granulated, pelletized, molded or spherical activated carbons, and the activated carbon has a particle size of 0.5 to 5 mm, with a specific internal surface area of 500 to 1500 $m^2/g$.

3. The process as claimed in claim 1, wherein the activated carbon fixed bed comprises 0.1 to 500 weight percent of activated carbon, based on the amount of purified phosphorus withdrawn from the activated carbon fixed bed per hour in step b).

4. The process as claimed in claim 1, wherein the activated carbon fixed bed comprises one or more adsorbents from the group consisting of zeolites, argillaceous earths, diatomaceous earths, silica gels, fuller's earths, perlites, magnesium silicates, glass particles or organic polymers in an amount of 0.1 to 20 weight percent, based on the activated carbon.

5. The process as claimed in claim 1, further comprising performing the process at a temperature of 45° C. to 120° C.

6. The process as claimed in claim 1, further comprising performing the process at a pressure of 0.1 to 3.0 bar.

7. The process as claimed in claim 1, further comprising passing the liquid impure phosphorus through the activated carbon fixed bed with a volume flow that ensures an average residence time of the phosphorus in the activated carbon fixed bed of 1 to 600 minutes, wherein the average residence time is the quotient of the volume of the fixed bed and the outflowing volume flow.

8. The process as claimed in claim 1, further comprising performing steps a) and b) in at least one container comprising at least one inflow point for introducing the liquid impure phosphorus, at least one adsorption zone for receiving the at least one activated carbon fixed bed, at least one sieve tray for securing the at least one activated carbon fixed bed, and at least one outflow point spatially removed from the inflow point for removal of the purified phosphorus.

9. The process as claimed in claim 1, further comprising dividing the liquid impure phosphorus into two or more substreams, and contacting each substream with at least one activated carbon fixed bed.

10. The process as claimed in claim 1, further comprising dividing the liquid impure phosphorus into two or more substreams, and, for each substream, performing the steps a) and b) with a separate activated carbon fixed bed, wherein the number of substreams and the number of activated carbon fixed beds is chosen such that the activated carbon in at least one activated carbon fixed bed is regenerated or replaced, while at least one other activated carbon fixed bed is utilized for performing steps a) and b).

11. The process as claimed in claim 1, further comprising, following steps a) and b):
   c) contacting the activated carbon fixed bed with hot water or water vapor,
   d) withdrawing water and phosphorus from the activated carbon fixed bed according to step c),
   e) regenerating the spent activated carbon in the activated carbon fixed bed, or replacing the spent activated carbon in the activated carbon fixed bed with fresh activated carbon, and
   f) recycling the phosphorus withdrawn in step d) back into step a).

12. The process as claimed in claim 11, further comprising dividing the liquid impure phosphorus into two or more substreams, and, for each substream, performing the steps a) and b) with a separate activated carbon fixed bed, wherein the number of substreams and the number of activated carbon fixed beds is chosen such that steps c) to f) are performed in at least one activated carbon fixed bed, while at least one other activated carbon fixed bed is utilized for performing steps a) and b).

13. The process as claimed in claim 10, wherein, in step c), the hot water has a temperature of 45° C. to 160° C., and the water vapor has a temperature of 100° C. to 240° C.

14. The process as claimed in claim 1, wherein the purified phosphorus withdrawn in step b) contains at least 50 percent less organic impurities than the impure phosphorus introduced in step a).

15. The process as claimed in claim 1, wherein:
the activated carbon fixed bed comprises:
    0.1 to 500 weight percent of activated carbon, based on the amount of purified phosphorus withdrawn from the activated carbon fixed bed per hour in step b), wherein the activated carbon comprises an activated carbon selected from the group consisting of grained, crushed, granulated, pelletized, molded or spherical activated carbons, and the activated carbon has a particle size of 0.5 to 5 mm, with a specific internal surface area of 500 to 1500 m²/g; and
    0.1 to 20 weight percent, based on the activated carbon, of one or more adsorbents from the group consisting of zeolites, argillaceous earths, diatomaceous earths, silica gels, fuller's earths, perlites, magnesium silicates, glass particles or organic polymers; and
the process further comprises:
    conducting steps a) and b) in at least one container comprising at least one inflow for introducing the liquid impure phosphorus into the container, at least one adsorption zone for receiving the at least one activated carbon fixed bed, at least one sieve tray for securing the at least one activated carbon fixed bed, and at least one outflow, spatially removed from the inflow, for removal of purified phosphorus from the container; and
    passing the liquid impure phosphorus through the container from the inflow to the outflow with a volume flow that ensures an average residence time of the phosphorus in the activated carbon fixed bed of 1 to 600 minutes, wherein the average residence time is the quotient of the volume of the fixed bed and the outflowing volume flow.

16. The process as claimed in claim 15, wherein:
the activated carbon fixed bed contains:
    1 to 300 weight percent of activated carbon based on the amount of purified phosphorus withdrawn from the activated carbon fixed bed per hour in step b); and
    0.5 to 10 weight percent, based on the activated carbon, of the one or more adsorbents;
the contacting is performed at a temperature of 45° C. to 95° C., and a pressure of 0.1 to 3.0 bar;
the liquid impure phosphorus is passed through the activated carbon fixed bed with a volume flow that ensures an average residence time of the phosphorus in the activated carbon fixed bed of 1 to 300 minutes; and
the purified phosphorus withdrawn in step b) contains at least 50 percent less organic impurities than the impure phosphorus employed in step a).

17. The process as claimed in claim 16, further comprising dividing the liquid impure phosphorus into two or more substreams, and, for each substream, performing the steps a) and b) in separate containers with separate activated carbon fixed beds, wherein the number of substreams and the number of containers with activated carbon fixed beds is chosen such that the activated carbon in at least one activated carbon fixed bed is regenerated or replaced, while at least one other activated carbon fixed bed remains in use performing steps a) and b).

18. The process as claimed in claim 17, wherein the regenerating or replacing comprises, following steps a) and b):
    c) contacting the activated carbon fixed bed with hot water or water vapor,
    d) withdrawing water and phosphorus from the activated carbon fixed bed according to step c),
    e) regenerating the spent activated carbon in the activated carbon fixed bed, or replacing the spent activated carbon in the activated carbon fixed bed with fresh activated carbon, and
    f) recycling the phosphorus withdrawn in step d) back into step a).

19. The process as claimed in claim 18, wherein:
in step c), the hot water has a temperature of 45° C. to 160° C., and the water vapor has a temperature of 100° C. to 240° C.;
the activated carbon fixed bed contains 1 to 50 weight percent of activated carbon based on the amount of purified phosphorus withdrawn from the activated carbon fixed bed per hour in step b);
the liquid impure phosphorus is passed through the activated carbon fixed bed with a volume flow that ensures an average residence time of the phosphorus in the activated carbon fixed bed of 2 to 100 minutes; and
the purified phosphorus withdrawn in step b) contains at least 55 to 95 percent less organic impurities than the impure phosphorus employed in step a).

* * * * *